Jan. 30, 1962 L. E. ELFES 3,018,864
DUAL CLUTCH
Filed May 27, 1958 2 Sheets-Sheet 2

INVENTOR.
LEE E. ELFES
BY Carlsen, Pitzner, Hubbard & Wolfe
ATTORNEYS.

ial Jan. 30, 1962

3,018,864
DUAL CLUTCH
Lee E. Elfes, Detroit, Mich., assignor to Massey-Ferguson Inc., Racine, Wis., a corporation of Maryland
Filed May 27, 1958, Ser. No. 738,168
Claims priority, application Great Britain May 30, 1957
3 Claims. (Cl. 192—113)

The invention relates to axially engageable friction clutches generally and more particularly to dual or multiple clutches incorporating two or more driven clutch members for transmitting power through two or more separate drives.

Friction clutches of the above general character have been found particularly advantageous in tractors. In that environment one of the driven clutch elements is utilized for transmitting power to the tractor drive wheels while the other driven member transmits power to the tractor power takeoff shaft. To conserve space, the dual clutches are ordinarily housed in one casing which is necessarily somewhat congested so that there is less air space and air flow and therefore less heat dissipating capacity than in the usual single clutches. This has given rise to failures in the friction lining and in the springs of the dual clutches, particularly the parts utilized to transmit power to the tractor drive wheels. It will be appreciated that tractor clutches are subject to heavy duty and in certain types of operations the driver tends to allow the transmission clutch to slip, which, of course, results in the generation of a substantial amount of heat.

One object of the invention is to provide an improved clutch construction which eliminates or materially reduces the risk of failure from overheating.

A more specific object is to provide a multiple clutch embodying novel features of construction which provides a continuous circulation of air over the clutch components effective to dissipate the heat generated in the operation of the clutch.

Other objects and advantages of the invention will become apparent from the following detailed description of the preferred embodiment and modifications illustrated in the accompanying drawings in which FIGURE 1 is a sectional view taken diametrically through a dual clutch embodying the features of the invention.

Figure 1:
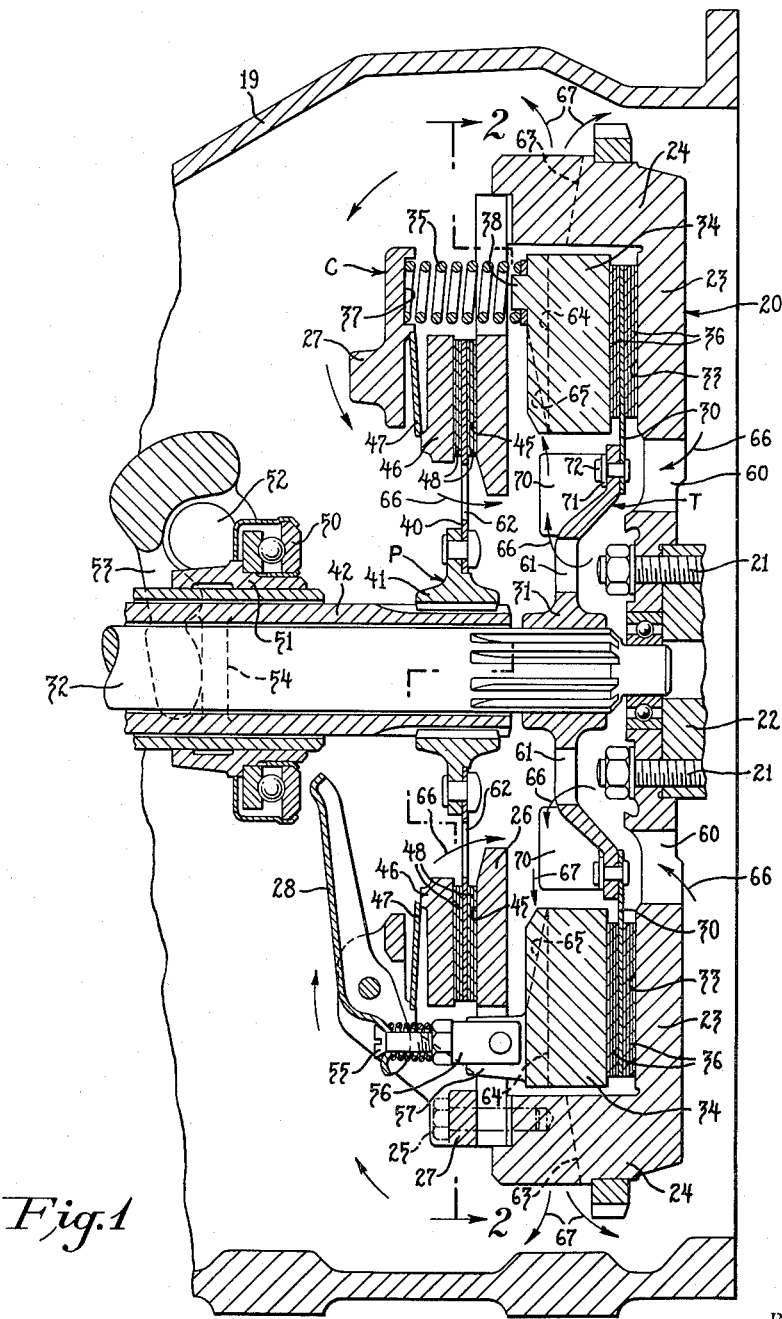

While a single preferred embodiment and several slight modifications of the invention have been shown and will be described herein, it is to be understood that the detailed character of the disclosure is not intended to limit the invention to such particulars. The intention is to cover all modifications and adaptations falling within the spirit and scope of the invention as more broadly and generally expressed in the appended claims.

For purposes of illustration the invention has been shown as incorporated in a dual clutch C of the type used in the Ferguson tractor. In this environment the clutch is installed in a housing 19 immediately at the rear of the tractor engine. Its two driven members T and P are utilized respectively to transmit power from the engine to the transmission which drives the ground wheels of the tractor and to the tractor power takeoff shaft by which implements or other auxiliary devices may be driven.

In the preferred form shown, the driving member of the clutch C comprises a flywheel 20 secured as by threaded studs 21 to the rear end of the engine crankshaft 22 for rotation therewith. The flywheel has a disc-shaped central portion 23 with an integral rearwardly extending flange 24 around its outer peripheral edge. Secured to the rear of the flange as by screws 25 is a flywheel cover or abutment plate 26. Also secured to the flange 24 by the screws 25 is a back plate 27 upon which are pivoted a single set of clutch-actuating or throwout levers 28, there being three such levers in the exemplary clutch.

The assembly above described rotates with the engine crankshaft and, in effect, constitutes a casing enclosing the two driven clutch members T and P. The front clutch member T comprises a flexible metal annulus 30 riveted or otherwise secured to the marginal edge portion of a hub member 31. The hub member has a splined driving connection with a shaft 32 through which power is transmitted to the tractor transmission. As will be seen by reference to FIG. 1, the hub 31 has its marginal edge portion offset forwardly to locate the annulus 30 in closely spaced relation to an annular friction driving face 33 provided on the flywheel inwardly of the flange 24.

To effect a driving connection between the flywheel and the driven clutch member T, the annular portion 30 of the member is yieldably urged against the friction surface 33 by an axially movable pressure plate 34. This pressure plate, as shown, is in the form of an annulus and it is yieldably urged toward the rear face of the flywheel by a series of coil springs 35 interposed between the pressure plate and the back plate 27 of the clutch. Preferably the driven clutch member is provided on both faces with discs 36 of friction material which cooperate with the friction surfaces of the flywheel and the pressure plate.

In the exemplary clutch the springs 35 are arranged in three groups, there being four of the springs in each group. As will be seen by reference to FIG. 2, the edge portions of the abutment plate 26 are appropriately recessed to afford clearance for the springs. To hold the springs in place, recessed seats 37 are provided in the back plate 27 in alinement with projections 38 on the pressure plate adapted to telescope into the springs.

The rear clutch element P also comprises a flexible metal annulus 40 riveted or otherwise attached to a central hub member 41. The hub member, in this instance, has a splined driving connection with a tubular shaft 42 telescoping over the transmission shaft 32. The shaft 42 is drivingly connected in well-known manner with the power takeoff shaft of the tractor.

The annular portion 40 of the rear clutch member extends between a friction driving surface 45 formed on the rear face of the abutment plate 26 and a rear pressure plate 46. This pressure plate is urged in a direction to clamp the clutch member against the abutment plate by an annular or Belleville spring 47 interposed between the pressure plate and the back plate 27. Rings 48 of friction material are provided on the clutch member for cooperation with the friction driving surfaces of the plates 26 and 46.

Means is provided for retracting the pressure plates 26 and 46 to disengage the driven clutch members in predetermined sequence, the members being reengaged by their respective springs in reverse sequence upon release of the actuating means. In the exemplary clutch the front or transmission clutch member is disengaged first followed by disengagement of the rear and power takeoff member. With this arrangement, the driver can interrupt the drive to the tractor transmission when desired, as, for example, to shift gears without interrupting the drive to the power takeoff shaft.

The clutch actuating means in its preferred form comprises a throw-out ring 50 rotatably mounted as by antifriction bearings on a sleeve 51 supported on the shaft 42 for movement axially of the shaft. In the forward movement of the sleeve, the ring 50 engages the inner ends of the throw-out levers 28 to rock them about their pivots. Such movement is imparted to the sleeve by the usual foot pedal operated rock shaft 52 which has a pair of rigid, radially projecting arms 53 straddling the sleeve 51 and engaging laterally projecting lugs 54 thereon. Upon release of pressure from the shaft operating pedal, the parts are returned to the normal clutch engaged position by the springs.

Throw-out levers 28 are operatively connected at their outer ends with the front pressure plate 34 and serve to withdraw that plate rearwardly against the force exerted by the springs 35. The connection to each lever includes a headed screw 55 extending through an aperture in the outer end of the lever and threading into a yoke-like element 56 which straddles and is pivotally secured to a lug 57 integral with and projecting rearwardly from the pressure plate 34. Timing of the clutch disengagement with reference to the movements of the actuator ring 50 may be adjusted by turning the screws 55 in or out as required. The screws are locked in adjusted position by suitable lock nuts.

For retracting the rear clutch pressure plate 46 to disengage the rear clutch member, the front pressure plate 34 carries a series of abutment elements 58 (FIG. 3) positioned to engage the front face of the rear pressure plate 46 upon predetermined rearward movement of the plate 34. The elements 58 conveniently comprise headed screws threaded into apertured pads 59 on the plate 34 and adapted to be screwed in or out to adjust the timing of the rear clutch disengagement. Suitable lock nuts on the screws 58 serve to lock them in adjusted position.

In the operation of tractors equipped with clutches of the above general character, the front clutch which transmits power to the tractor drive wheels is subject to relatively heavy duty at all times. Moreover, when the tractor is used with certain types of implement as, for example, loaders, the driver frequently finds it convenient to allow that clutch to slip. As a result, considerable heat is generated which can damage the friction linings or other parts of the clutch unless quickly dissipated. This is particularly serious in dual clutches because of their compactness and the close confinement of the frictionally engaging parts in substantially enclosed areas.

In accordance with the invention the improved clutch is constructed and arranged in a novel manner which effectively eliminates or materially reduces overheating and consequent damage to the clutch parts. To this end, the clutch components are constructed to provide a series of axially and radially extending passages for circulating air around the parts subject to greatest heating. The passages are so related that the rotation of the clutch induces a continuous flow of air in substantial volume through the clutch when it is in operation.

Passages for axial flow of air into the interior of the clutch are provided by openings 60, 61 and 62 in the flywheel 20, the front clutch member T and the rear clutch member P, respectively. In the exemplary clutch these openings are circular holes, located relatively close to the rotational axes of the elemnts. Thus, the holes 60 are arranged in an annular series in the central portion 23 of the flywheel concentric with and relatively close to the rotative axis of the flywheel. The holes 61, in this instance, are formed in the hub 31 of the front clutch member T while holes 62 are formed in the annular element 40 of the rear clutch member P.

Figure 2:
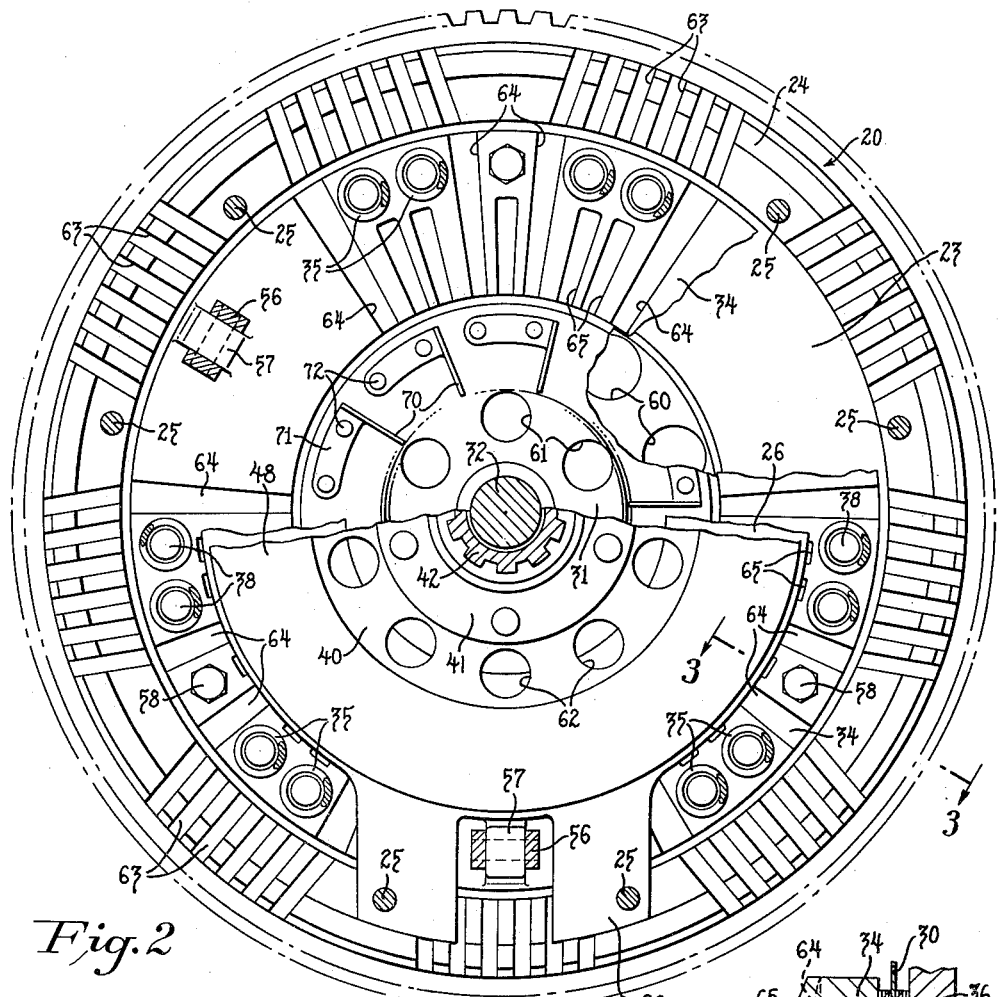
FIG. 2 is a sectional view of the clutch taken generally in a plane substantially on the line 2—2 of FIG. 1 with parts broken away to show structural details.

To direct the flow of air for most efficient cooling, the flanges 24 of the flywheel and the front pressure plate 34 are formed with openings defining passages or discharge ducts opening radially outwardly from the interior of the clutch. In the preferred from shown in FIG. 1, the flywheel flange 24 is formed with a plurality of openings in the form of slots 63. These slots are are arranged in groups as shown in FIG. 2, there being nine such groups with six slots in each group in the exemplary clutch. The central slots of each group are substantially radially disposed with respect to the flywheel while the other slots are parallel to the first mentioned slots. In the form shown in FIGS. 1–3, the bottom walls of the slots 63 are inclined outwardly toward the front of the flywheel to afford maximum depth at the periphery of the flange as shown.

Figures 3, 4, 5:
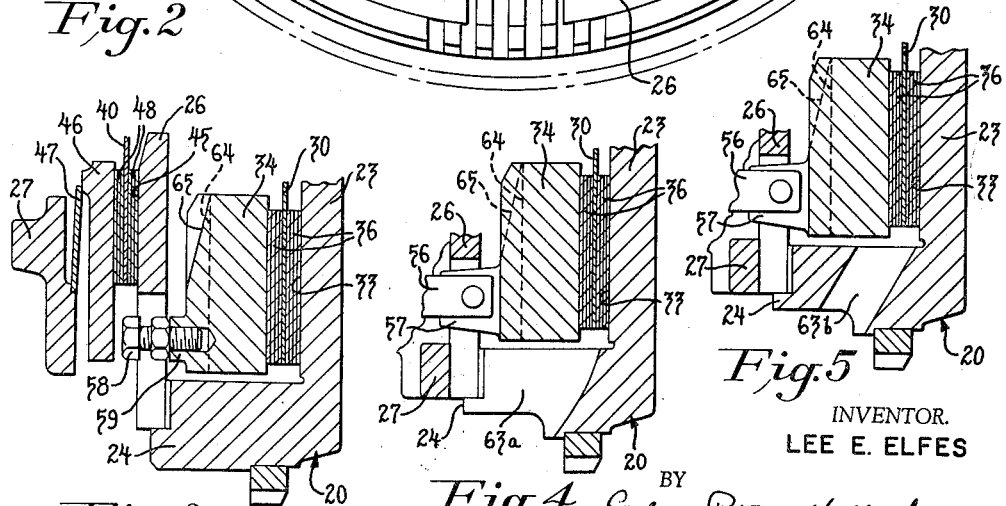
FIG. 3 is a fragmentary sectional view taken in a plane substantially on the line 3—3 of FIG. 2.
FIGS. 4 and 5 are fragmentary sectional views through the edge portion of the clutch showing modified forms of the components.

The rear face of the front pressure plate 34 is also formed with groups of slots positioned to aline generally with the slots in the flywheel flange. In the exemplary clutch, there are four slots in each group in the plate 34 including two outside slots 64 and two inside slots 65. The outside slots 64 are of substantially uniform depth as shown in FIGS. 1 and 3 and extend completely across the pressure plate. The slots 65, on the other hand, have inclined bottom walls terminating inwardly of the spring anchoring projections 38. Accordingly, air discharged through the slots 65 is directed over the springs 35 to dissipate the heat received by those springs from the pressure plate.

The slots 63, 64 and 65, in effect, constitute a series of nozzle-like ducts opening from the interior of the clutch to its periphery. As the clutch rotates at relatively high speed, centrifugal action induces a substantial air flow outwardly through those ducts. Air is drawn in an axial flow through the openings 60, 61 and 62 as indicated by the arrows 66 (FIG. 1) and discharged in a radial direction through the slots 63—65 as indicated by the arrows 67. Heat generated in the clutch and particularly the heat resulting from the slipping of the front clutch is thus effectively dissipated to prevent overheating and damage to the friction linings or other parts of the clutch.

Air flow through the clutch may be increased considerably if desired by mounting a series of scoops or vanes 70 on one of the rotating clutch members, preferably the front clutch member T. As shown in FIG. 2, the vanes 70 may conveniently comprise sheet metal stampings each having an upstanding air impelling portion and an integral base portion 71 bent over at right angles and secured to the peripheral edge portion of the hub 31 as by rivets 72. The air impelling portions of the vanes preferably project at right angles to the plane of the clutch member and are preferably radially disposed with respect to the member to enable them to perform their air moving function efficiently.

In the modified form of the clutch shown in FIG. 4, the slots 63a in the flywheel flange 24 are formed substantially deeper than the slot 63. Moreover, the bottom walls of the slots are slightly arcuate and are inclined rearwardly from the face of the flywheel. The slots are thus enabled to discharge air directly from the vicinity of the friction linings 36 of the front clutch member.

FIG. 5 shows a still further modification of the flywheel in which the slots 63 are replaced by holes 63b drilled or otherwise formed in the flange 24 of the flywheel. Preferably the holes open adjacent the rear face or fricton surface of the flywheel and are inclined rearwardly therefrom.

It will be apparent from the foregoing that the invention provides a dual friction clutch of novel and advantageous construction. The clutch is extremely compact and well adapted for accommodation in the housing of a conventional tractor. Despite such compactness, overheating of the clutch components is effectually avoided by the construction and arrangement of the parts to provide a continuous flow of air through the clutch and over the components most subject to heating. Heat generated in the clutch is thus effectively dissipated.

I claim as my invention:

1. In a clutch, in combination, a rotatably driven flywheel having a peripheral flange and an annular friction driving surface located inwardly of the flange, a back plate rigidly secured to said flange and extending over said driving surface, an annular pressure plate supported between said back plate and said flywheel, a series of springs interposed between said plates yieldably urging the pressure plate toward the driving surface of said flywheel, a driven clutch member having its marginal edge portion disposed between said pressure plate and said flywheel driving surface, said flywheel having a series of openings disposed inwardly of said driving surface and said driven member having a series of openings disposed inwardly of its marginal portion, said flange and said pressure plate each having a series of generally radially disposed slots opening outwardly from the face of the flywheel, said slots being located farther from the rotational axis of the clutch member than said openings so that rotation of the clutch induces a continuous flow of air inwardly through said openings and outwardly through said slots, certain of the slots in said pressure plate having walls inclined to the plane of the flywheel in a direction effective to direct a portion of the air flow against said springs along substantially their entire length to prevent excessive heating.

2. In a dual clutch, in combination, a rotatably driven flywheel having a peripheral flange, an annular abutment member secured at its outer marginal edge to said flange and extending inwardly therefrom, a back plate secured to said flange in spaced relation to said abutment member, a first driven clutch member and cooperating pressure plate disposed between said abutment member and said flywheel, a second driven clutch member and cooperating pressure plate disposed between said back plate and said abutment member, spring means interposed between said back plate and said pressure plates yieldably urging the respective driven members into frictional engagement with said flywheel and with said abutment member, means for retracting said pressure plates to disengage said driven members, said flywheel and said driven members having openings located closely adjacent their rotational axes for admitting air to the interior of the clutch, and said flywheel flange and said first pressure plate having openings located outwardly from said first mentioned openings defining a series of peripherally opening ducts for the discharge of air from the interior of the clutch, the openings in said pressure plate comprising a plurality of groups of slots formed in the face of the plate remote from the flywheel, certain of said slots having walls substantially parallel to the face of the flywheel effective to direct the flow of air through the ducts in said flange and other of the slots having walls inclined rearwardly relative to the face of the flywheel effective to direct the flow of air against said spring means along substantially their entire length, the rotation of said clutch inducing a continuous flow of air through said openings and said ducts effective to dissipate the heat generated in the clutch.

3. In a dual clutch, in combination, a rotatably driven flywheel having a peripheral flange, an annular abutment member secured at its outer marginal edge to said flange and extending inwardly therefrom, a back plate secured to said flange in spaced relation to said abutment member, a first driven clutch member and cooperating pressure plate disposed between said abutment member and said flywheel, a second driven clutch member and cooperating pressure plate disposed between said back plate and said abutment member, spring means interposed between said back plate and said pressure plates yieldably urging the respective driven clutch members into frictional engagement with said flywheel and with said abutment member, means for retracting said pressure plates to disengage said driven members, said flywheel and said driven members having openings located closely adjacent their rotational axes for admitting air to the interior of the clutch, and said flywheel flange and the pressure plate cooperating with said first driven clutch member having openings disposed outwardly from said first mentioned openings defining peripherally opening ducts for the discharge of air from the interior of the clutch, and impeller elements mounted on said first driven member intermediate the inner and outer sets of openings operative in the rotation of the clutch to induce a continuous flow of air through said openings and said ducts to effectively dissipate the heat generated in the clutch.

References Cited in the file of this patent

UNITED STATES PATENTS

| | | |
|---|---|---|
| 1,731,416 | Gurney | Oct. 15, 1929 |
| 1,767,309 | Ricardo | June 24, 1930 |
| 2,107,954 | Morton et al. | Feb. 8, 1938 |
| 2,205,629 | Peterson | June 25, 1940 |
| 2,584,190 | Danly et al. | Feb. 5, 1952 |

FOREIGN PATENTS

| | | |
|---|---|---|
| 1,103,134 | France | May 18, 1955 |